US012679541B2

(12) United States Patent
Parish et al.

(10) Patent No.: US 12,679,541 B2
(45) Date of Patent: Jul. 14, 2026

(54) PASSENGER CUBICLE ASSEMBLY

(71) Applicant: SAFRAN SEATS GB LIMITED, Cwmbran (GB)

(72) Inventors: Daniel Parish, Cwmbran (GB); Mark Douglas, Cwmbran (GB)

( * ) Notice: Subject to any disclaimer, the term of this patent is extended or adjusted under 35 U.S.C. 154(b) by 179 days.

(21) Appl. No.: 18/576,064

(22) PCT Filed: Jun. 28, 2022

(86) PCT No.: PCT/GB2022/051660
§ 371 (c)(1),
(2) Date: Jan. 2, 2024

(87) PCT Pub. No.: WO2023/275535
PCT Pub. Date: Jan. 5, 2023

(65) Prior Publication Data
US 2024/0308666 A1    Sep. 19, 2024

(30) Foreign Application Priority Data
Jul. 2, 2021    (GB) ...................................... 2109618

(51) Int. Cl.
B64D 11/06 (2006.01)

(52) U.S. Cl.
CPC ................................ B64D 11/0606 (2014.12)

(58) Field of Classification Search
CPC ........ B64D 2011/0046; B64D 11/0606; B64D 11/0023
See application file for complete search history.

(56) References Cited

U.S. PATENT DOCUMENTS 11,667,369 B2 * 6/2023 Gallagher, Jr. ........... E06B 7/32
                                              244/118.5
12,134,474 B2 * 11/2024 Woodington ...... B64D 11/0023
12,337,970 B2 * 6/2025 McGreevy ......... B64D 11/0606
(Continued)

FOREIGN PATENT DOCUMENTS

GB       2588122 A    4/2021
WO    2021/069886 A1    4/2021
WO    2021/084479 A1    5/2021

OTHER PUBLICATIONS

Anonymous: "Pocket Door Repair (DIY) Family Handyman", Retrieved from the Internet URL:https://www.familyhandyman.com/project/pocket-door-repair/, Sep. 6, 2022, 9 pages.
(Continued)

*Primary Examiner* — Gisele D Ford
(74) *Attorney, Agent, or Firm* — WOMBLE BOND DICKINSON (US) LLP

(57) ABSTRACT

A passenger cubicle assembly including a door, a door support assembly having a sliding mechanism, the sliding mechanism arranged to support the door such that the door is translatable relative to the door support assembly along a first axis; a wall containing the door support assembly, the wall having an opening sized to permit translation of the door through the opening; wherein the door support assembly is moveable into the opening and, while in the opening, the door support assembly is rotatable about a rotation axis perpendicular to the first axis.

17 Claims, 10 Drawing Sheets

(56) References Cited

U.S. PATENT DOCUMENTS

| | | | | |
|---|---|---|---|---|
| 2004/0173327 | A1* | 9/2004 | Steel | E06B 3/50 |
| | | | | 160/210 |
| 2006/0145007 | A1* | 7/2006 | Melberg | B64D 45/0028 |
| | | | | 244/118.5 |
| 2012/0000129 | A1* | 1/2012 | Kuznetsov | E05F 15/632 |
| | | | | 49/180 |
| 2015/0311102 | A1* | 10/2015 | Weiss | A47B 96/00 |
| | | | | 49/319 |
| 2017/0283064 | A1* | 10/2017 | Robinson | E05D 15/58 |
| 2018/0281963 | A1* | 10/2018 | Dowty | B64D 11/0606 |
| 2019/0329891 | A1 | 10/2019 | Bonnefoy et al. | |
| 2020/0207454 | A1* | 7/2020 | Gallagher, Jr. | E06B 5/12 |
| 2021/0163139 | A1* | 6/2021 | Bonnefoy | B64D 11/0606 |
| 2021/0179254 | A1 | 6/2021 | Scotford et al. | |
| 2022/0332423 | A1* | 10/2022 | Thomas | E06B 3/46 |
| 2022/0340283 | A1* | 10/2022 | McGreevy | B64D 11/0606 |

OTHER PUBLICATIONS

Combined Search and Examination report of GB Application No. 2109618.5 dated Dec. 20, 2021.
International Preliminary Report on Patentability received for PCT Patent Application No. PCT/GB2022/051660, mailed on Jan. 11, 2024, 8 pages.
International Search Report and Written Opinion received for PCT Patent Application No. PCT/GB2022/051660, mailed on Sep. 16, 2022, 14 pages.

* cited by examiner

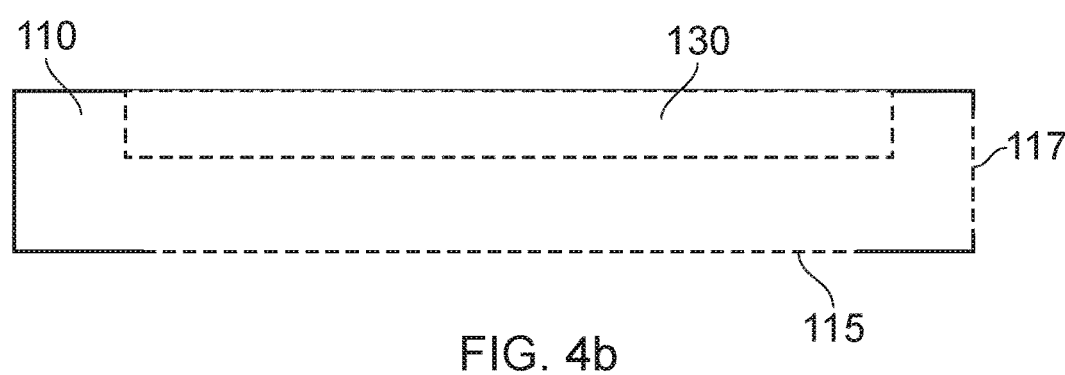
FIG. 4a
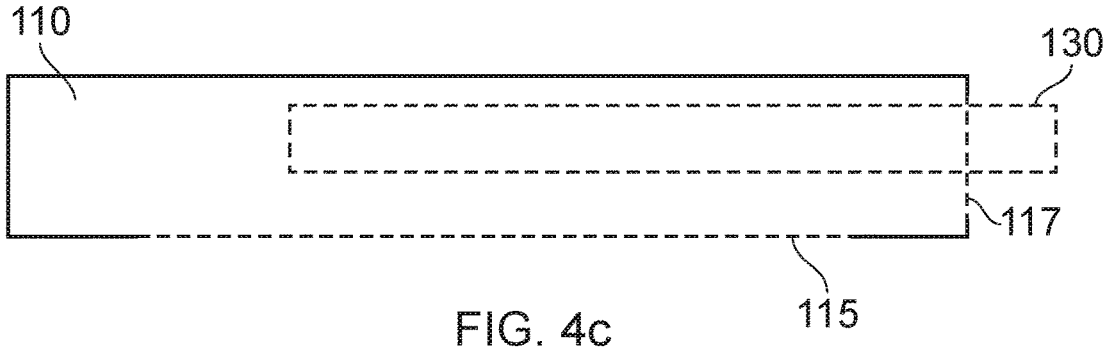
FIG. 4b
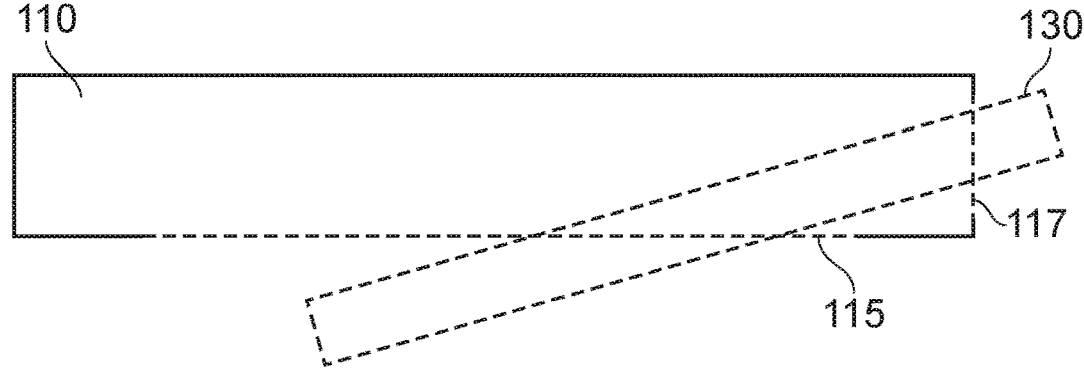
FIG. 4c
FIG. 4d

PASSENGER CUBICLE ASSEMBLY

BACKGROUND

Within some vehicles, there is a desire to provide walls or other privacy screens to separate the vehicle into compartments in order to provide passengers with their own personal area. In order to provide access to the personal area, while maintaining privacy, a door may be provided, which may be openable to allow access and closable to provide privacy. Further, in order to avoid the obstruction of corridors or aisles, it may be desirable to provide the door as a sliding door, as opposed to a hinged door.

Further design constraints are that the door and its workings should be accessible without the use of tools, and the method of dismantling the door should not be evident to passengers within the compartment. This may allow removal of the door in emergencies, while avoiding undesirable tampering of the door by passengers. Further, any access panels or openings should be made small in order to provide structural strength to the walls of the compartment.

SUMMARY OF THE INVENTION

According to a first aspect of the invention, there is provided a passenger cubical assembly comprising: a door; a door support assembly having a sliding mechanism, the sliding mechanism arranged to support the door such that the door is translatable relative to the door support assembly along a first axis; a wall containing the door support assembly, the wall having an opening sized to permit translation of the door through the opening; wherein the door support assembly is moveable into the opening and, while in the opening, the door support assembly is rotatable about a rotation axis perpendicular to the first axis.

With such an arrangement, the door support assembly may be removed via an access port in the wall which is shorter in length than the door support assembly as required for maintenance or replacement of the door support assembly.

The sliding mechanism may comprise a rail fixed to the door support assembly and a carriage arranged to slide along the rail, the carriage being coupled to the door. By providing a carriage and rail on the door support assembly, the door may be made lighter as it need not include the rail.

The door may be coupled to the carriage via one or more pins, such that the door is removable from the carriage assembly via translation parallel to the rotation axis. Translation of the door parallel to the rotation axis (i.e. vertically when the door is arranged to slide horizontally) is a direction a passenger would not naturally move the door and so the prospect of inadvertent removal of the door by a passenger is reduced. Further, coupling via pins may allow the door to be removed via a simple translation, without the use of any tools.

The passenger cubicle assembly may further comprise a rotatable cap arranged to rotate between a first position where the rotatable cap prevents decoupling of the door from the carriage, and a second position where the rotatable cap allows decoupling of the door from the carriage. The rotatable cap may be arranged at a top of the door and so the movement of the rotatable cap may not be obvious to a passenger, while the rotation of the cap to allow decoupling of the door may be a simple movement for a crew member or maintenance worker to perform in order to allow removal of the door.

The rotatable cap may be arranged to engage the carriage in the second position to prevent movement of the carriage along the rail and the rotatable cap may be arranged to allow movement of the carriage when in the first position. Optionally, the rotatable cap may maintain the carriage in a position on the rail closest to the doorway, such that the door is fully extended from the wall, when in the second position. This may prevent movement of the sliding mechanism and may thereby allow the door to be removed more easily and may prevent the carriage from being lost inside the wall while the door is decoupled from the sliding mechanism.

The passenger cubicle assembly may further comprise a detent arranged to maintain the rotatable cap in the first and/or second position. The detent may prevent inadvertent rotation of the rotatable cap, such as during turbulence.

The passenger cubicle assembly may further comprise a plurality of removable fixing members arranged to fix the door support assembly to the wall, to prevent movement of the door support assembly relative to the wall. The removable fixing members may be adjustable to adjust the position and orientation of the door support assembly relative to the wall. This may allow the position of the door to be adjusted in order to line up with the wall. The removable fixing members may prevent inadvertent movement of the door support assembly when it is in place and may be removed to allow removal of the door support assembly so that the door support assembly may be repaired or maintained.

The door may further comprise a wheel arranged to roll on an adjacent rail parallel to the first axis. Alternatively, the wheel may be floor-mounted to rotate about a fixed axis and may engage an edge of the door, optionally the door may comprise a rail arranged to engage the wheel. The wheel in this case may be within the wall and may be covered by the wall in order not to obstruct the doorway. Where the door is arranged to move horizontally along a horizontal wall, the rail may be arranged along a floor on which the wall is placed. The wheel may also support a substantial portion of the weight of the door, to avoid excessive force being exerted on the sliding mechanism.

The wheel, whether arranged to rotate about a stationary axis or fixed to the door, may be grooved to prevent rotation of the door about an axis perpendicular to the first axis. This may allow the door to be fixed in orientation while the pins on which the door is mounted may be axisymmetric, improving ease of coupling and decoupling of the door from the pins. The wheel may also be spaced from the pins of the door along the first axis.

According to a second aspect of the invention, there is provided an aircraft including the passenger cubicle assembly of the first aspect.

According to a third aspect of the invention, there is provided a method of removing a door support assembly from a wall, the door support assembly having a sliding mechanism, the sliding mechanism arranged to support a door such that the door may translate relative to the wall along a first axis through an opening in the wall; the method comprising: moving the door support assembly in a first direction into the opening in the wall; rotating the door support assembly about a rotation axis perpendicular to the first direction; and removing the door support assembly from the wall via an access port formed in the wall by moving the door support assembly in a second direction, the second direction being perpendicular to the rotation axis.

This method may allow the removal of the door support assembly from a wall using a smaller access port within the wall.

The method may further comprise removing a fixing member from the door support assembly, the fixing member being arranged to fix the door support assembly to the wall. The fixing member may be an adjustable fixing member arranged to adjust the position and orientation of the door support assembly relative to the wall.

The method may further comprise decoupling the door from the door support assembly before moving the door support assembly. This may allow the door and door support assembly to be split into separate portable modules, allowing a smaller number of people to carry out the door support assembly removal. It may also allow removal of the door support assembly through a smaller access port than would otherwise be required The wall may further comprise a rotatable cap, and the method may further comprise rotating the rotatable cap from a first position in which the rotatable cap extends at least partially over the door to prevent decoupling of the door from the door support assembly to a second position in which the rotatable cap extends over the door to a lesser extent, such that the door can be decoupled to the door support assembly.

BRIEF DESCRIPTION OF THE DRAWINGS

FIGS. 4a to 4d show schematic plan views of the passenger cubicle assembly in different stages of removal of the door support assembly;

DETAILED DESCRIPTION

Figure 1:
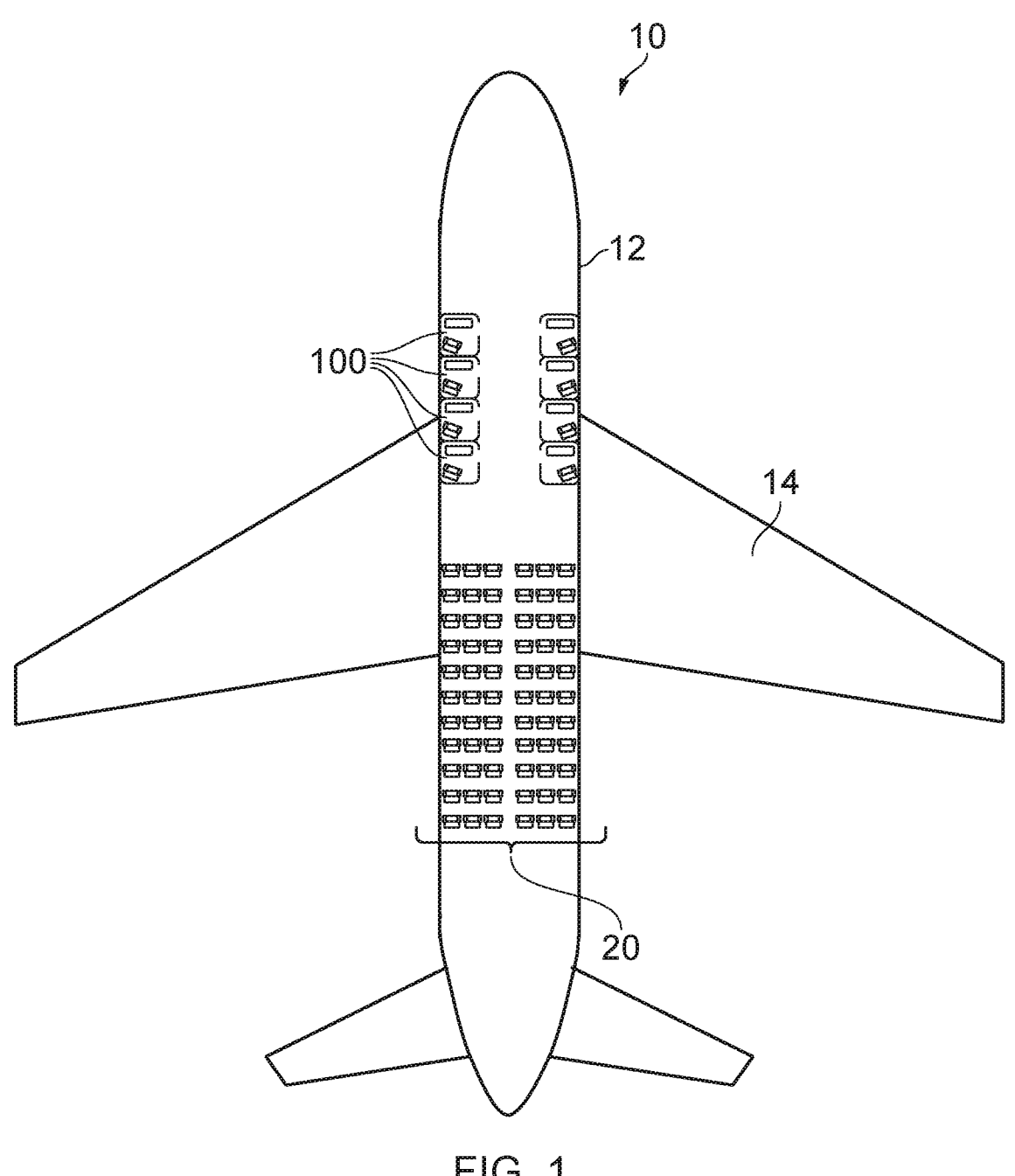
FIG. 1 shows a schematic plan view of an aeroplane.

FIG. 1 shows an aircraft 10 in a schematic plan view. The aircraft 10 has a fuselage 12 and wings 14 extending outwardly from the fuselage 12. Within the fuselage 12 there is a seating area 20 having a plurality of seats arranged in rows such that the seats are one behind the other. The fuselage 12 also has passenger cubicles 100, which contain seats and may contain television or other entertainment screens and/or beds for occupying the passenger during the flight and arranged to provide privacy to the passengers during the flight.

Figure 2A:
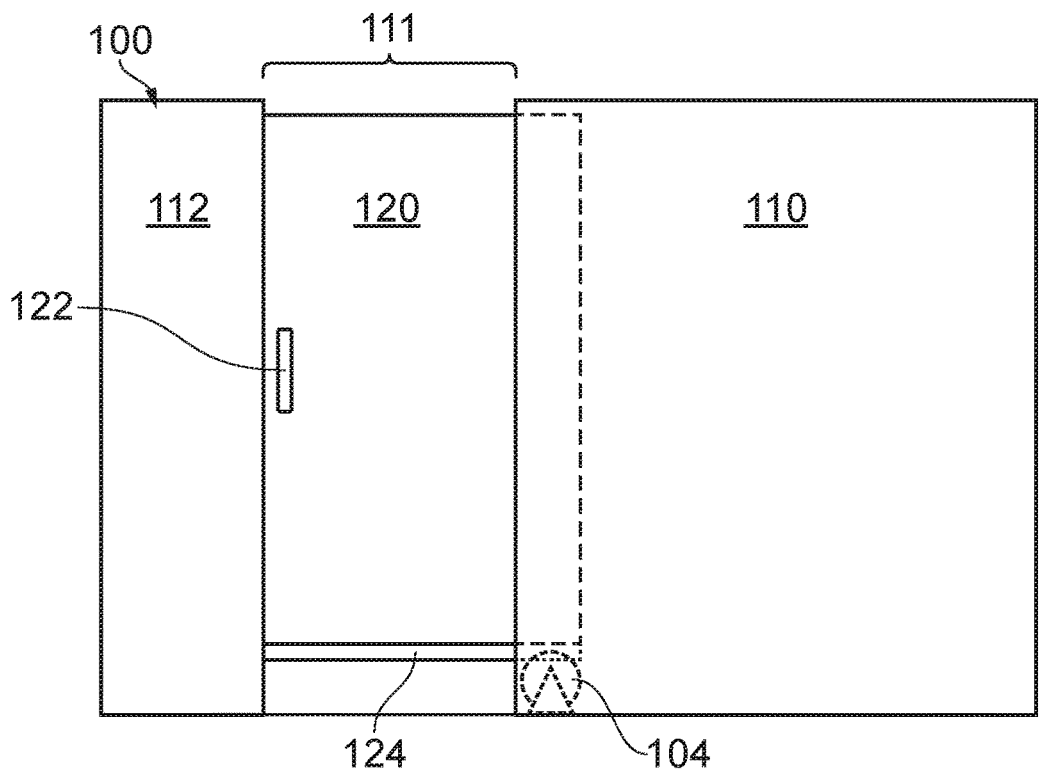
FIGS. 2a and 2b show a side view of a passenger cubicle assembly with a door in an extended and retracted position.

FIG. 2a shows a side view of a passenger cubicle assembly 100, i.e. a view of the passenger cubicle assembly 100 from an aisle of the aircraft. However, it will be understood that the relevant portions of the passenger cubicle assembly may appear substantially similar from the inside of the passenger cubicle assembly. The passenger cubicle assembly 100 has a first wall 110 and a second wall 112 separated by a doorway 111. A door 120 is coupled to the wall 110 such that it May slide relative to the wall 110 in order to obscure the doorway 111 or to open the doorway 111 and may be received in the wall 110. The door 120 has a door handle 122 by which a passenger may exert force on the door 120 in order to open or close the door 120. The door is supported on a wheel 104 which may support a significant portion of the weight of the door and may be arranged within the wall 110, into which the door may slide. The wheel 104 may slide along a rail 124 which may be fixed to the door 120.

It will be understood that the wall 110 may have a more significant depth or thickness than the door 120, so that the door 120 may slide into the wall 110 and the wall 110 may have an opening at an end face of the wall 110 arranged to receive the door 120.

Figure 2B:
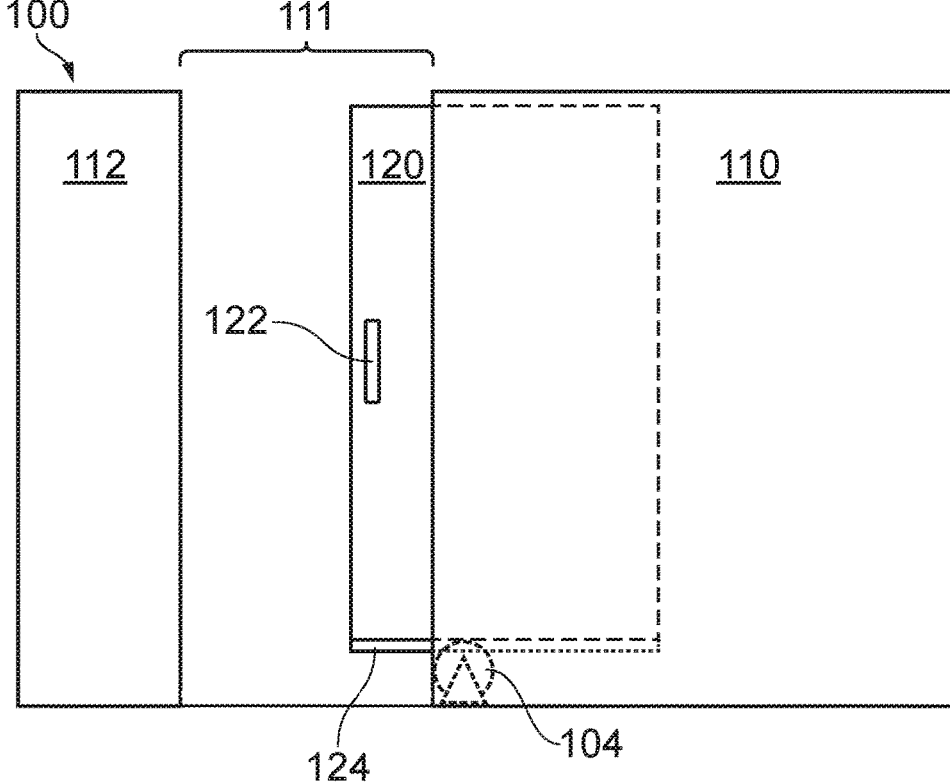

As can be seen in FIG. 2b, the door 120 may be received within the wall 110 via an opening in the end of the wall 110 in order to open the doorway 111.

Figure 3A:
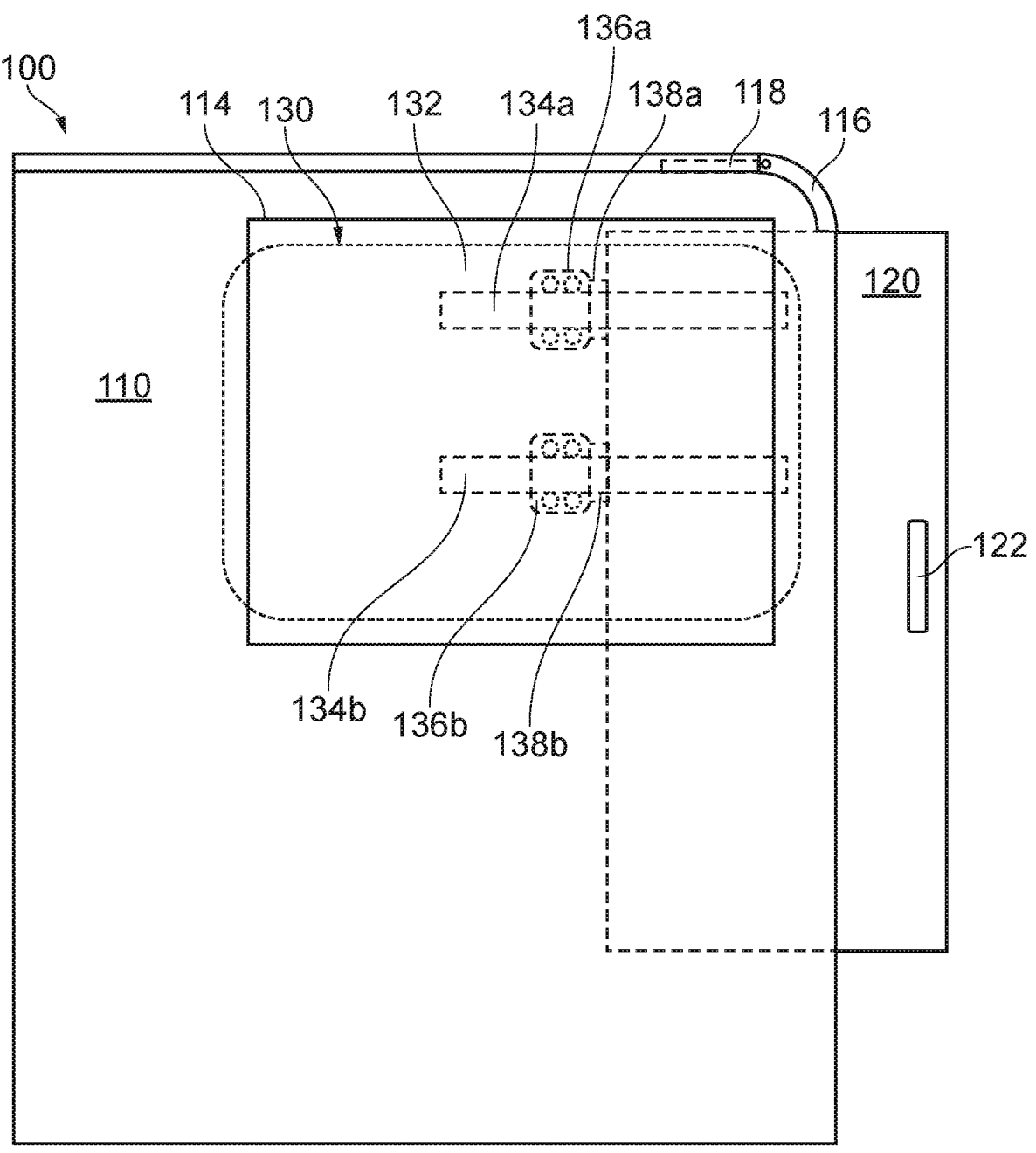
FIGS. 3a to 3f show a schematic side view of the passenger cubicle assembly in different stages of the removal of the door support assembly.

FIGS. 3a to 3f show the passenger cubicle assembly 100 during various stages of disassembly. In FIG. 3a, the wall 110 and door 120 can be seen from the reverse direction (i.e. from within the passenger cubicle assembly 100). Within the wall 110, i.e. forming a portion of the outer surface of the wall 110, there is an access panel 114 obscuring an access port. The access panel 114 and access port may be arranged on the side of the wall facing into the cubical so that the face of the wall facing the aisle may be continuous. Behind the access panel 114, within the wall 110, is a door support assembly 130, which includes a sliding mechanism for supporting the door. The sliding mechanism is supported on a door support panel 132. The door support panel 132 is fixed to the wall 110, optionally the door support panel 132 may be adjustably fixed to the wall 110, and provides a rigid and integral structure for supporting the sliding mechanism, which in turn allows movement of the door.

Two sliding mechanisms are supported on the door support panel 132. Each sliding mechanism has a rail 134a,b fixed to the door support panel and oriented along a first axis and a carriage 136a,b arranged to run along the rail 134a,b. The carriages may be slide blocks containing rolling bearings for rolling along the rails 134a,b. The carriages 134a,b are coupled to the door 120 via a coupling mechanism 138a,b. The coupling mechanisms 138a,b may include pins which may be oriented perpendicular to the rails 134a,b, the pins being fixed to the carriages 136a,b and the door 120 being fixed to barrels, which may be arranged to receive the pins. In this way the door 120 may be supported on the door support assembly 130 such that the door 120 may slide relative to the wall 110. The door may additionally be supported on a wheel as shown in FIGS. 2a and 2b in order to prevent rotation of the door 120 about the coupling mechanisms 138a,b.

The passenger cubicle assembly 100 also has a rotatable cap 116, which is pivotally fixed to the wall 110. In FIG. 3a, the rotatable cap 116 is shown in a first position, in which it extends over the door 120 to prevent vertical movement of the door 120, so that the door cannot be decoupled from the door support assembly 130 by vertical movement.

Figure 3B:
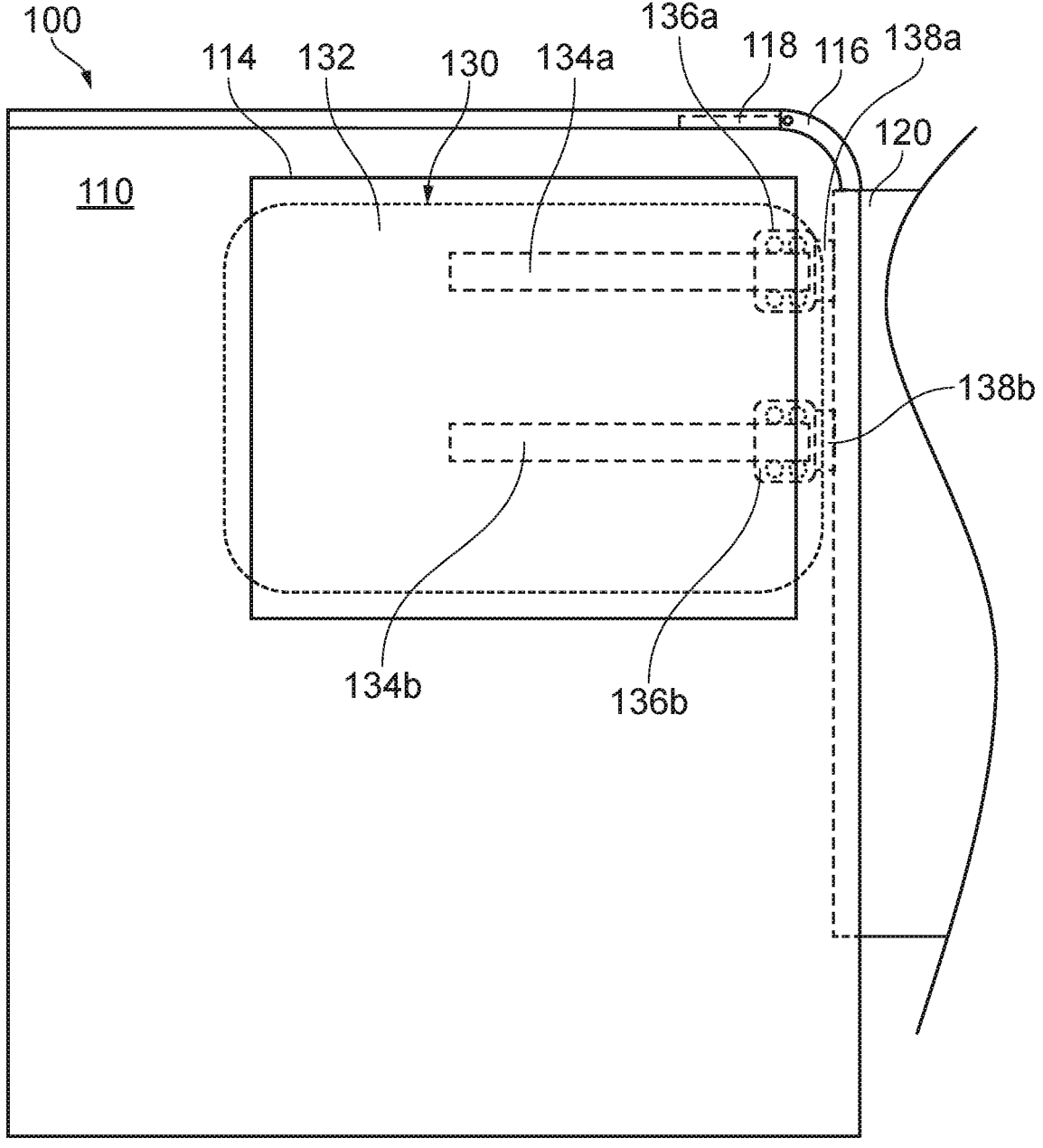

FIG. 3b shows the door 120 in a fully extended position, where the carriages 136a, b are arranged at ends of the rails 134a, b and the door 120 is positioned across the doorway 111. In this position, the carriages are below the rotatable cap 116 so that the rotatable cap can engage the carriages as explained below and the top surface of the door 120 is covered only by the rotatable cap 116, so that movement of the rotatable cap may allow vertical lifting of the door.

Figure 3C:
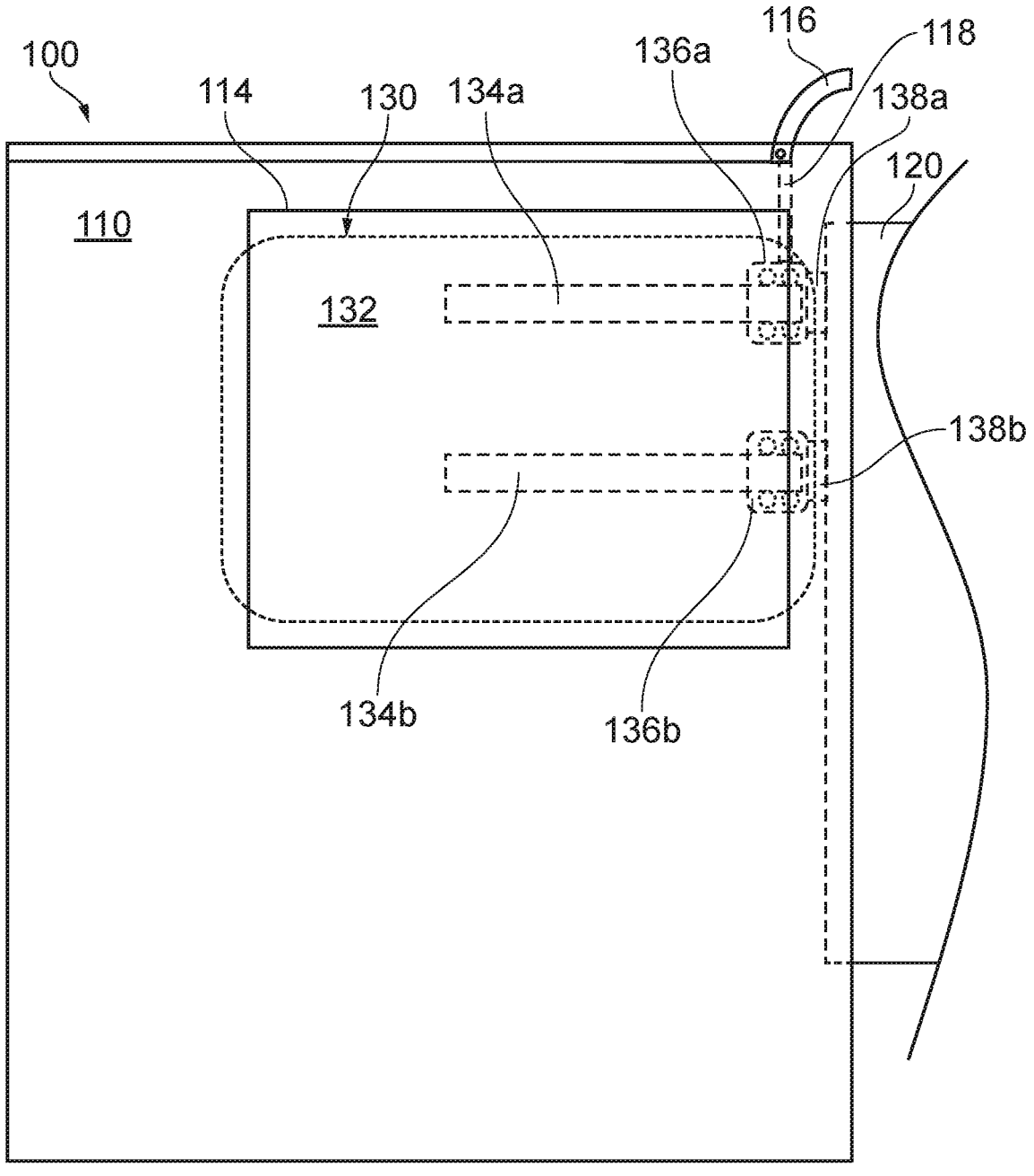

In FIG. 3c, the rotatable cap 116 is shown in the second position, where the cap is rotated such that it extends over the door to a lesser extent. This may allow the door to be removed from the pins via sliding vertically, in a direction perpendicular to the orientation of the rails. It will be understood that, while the rotatable cap 116 of FIG. 3b has the form of a quarter circle, an elliptical or rectangular cap may alternatively be used.

Further, in the second position, a tail 118 of the rotatable cap 116 is engaged with a carriage 136a. This maintains the carriage 136a in the position at an end of the rail 134a. The two carriages 136a,b may also be linked so that they do not move relative to each other. In this way, the tail 118 of the rotatable cap 116, when in the second position, may maintain both carriages 136a,b in position at the ends of the rails 134a,b. This may avoid the carriages 136a,b sliding into the wall 110 and so make the decoupling and recoupling of the door 120 to the carriages 136a,b via the coupling mechanisms 138a,b easier.

Figure 3D:
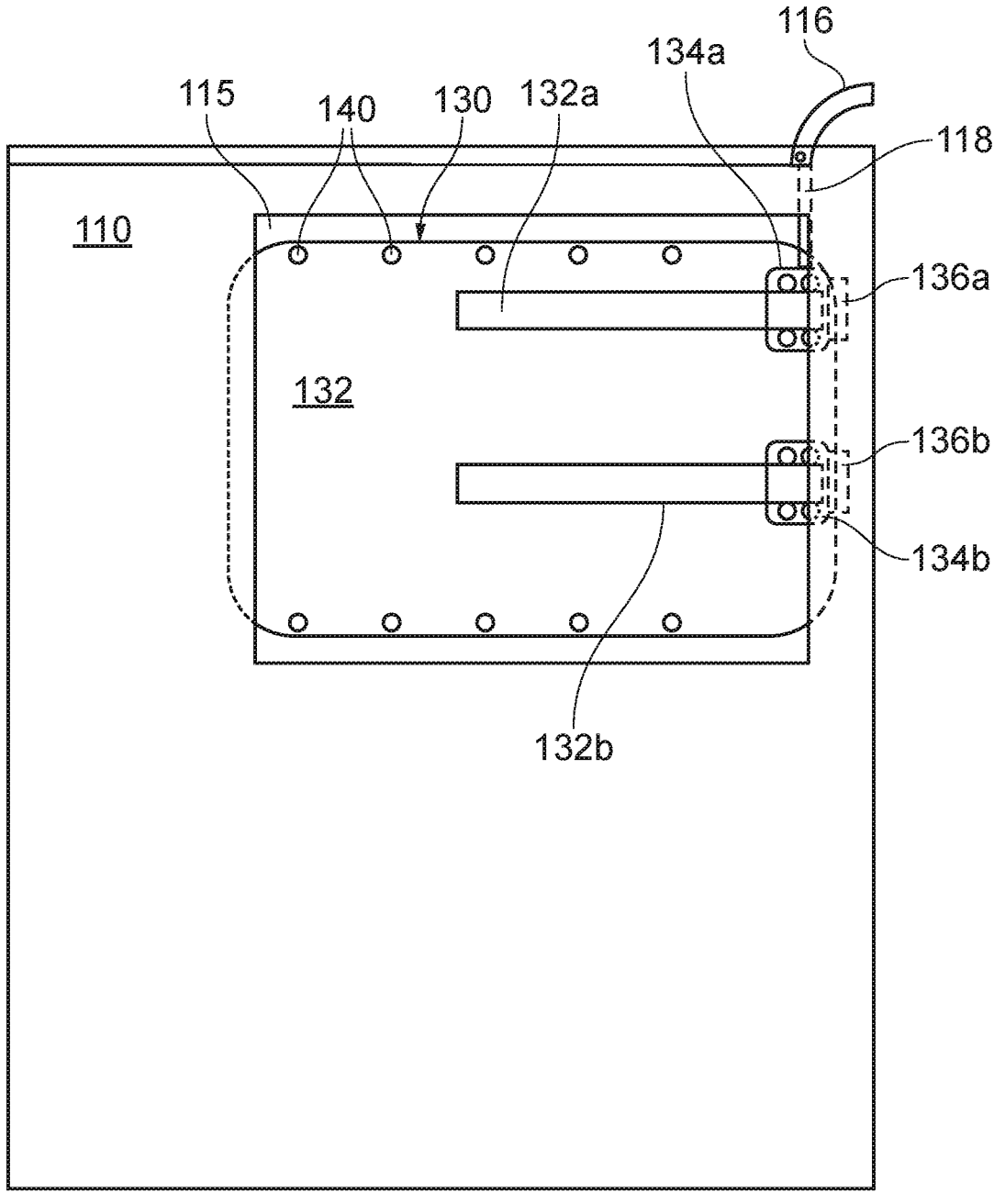

In FIG. 3d, the access panel 114 has been removed and the access port 115 is open. The access port 115 may be a substantially rectangular hole or opening into the wall 110 and is positioned in a side face of the wall 110. As is shown in FIG. 3d, the access port 115 may have a first dimension (e.g. a vertical dimension) greater than the first dimension of the door support structure 130 and a second dimension (e.g. a horizontal dimension) which is smaller than the second dimension of the door support assembly 132. The fixing members 140, which may also be referred to as fixing means, and may be screws or bolts, are also shown here. The fastening members 140 may be removed in order to decouple the door support assembly 130 from the wall 110. It will also be noted that the fixing members 140 may be adjustable so that the position and/or orientation of the door support assembly 130 and thereby the position and orientation of the door 120 may be adjusted.

Figure 3E:
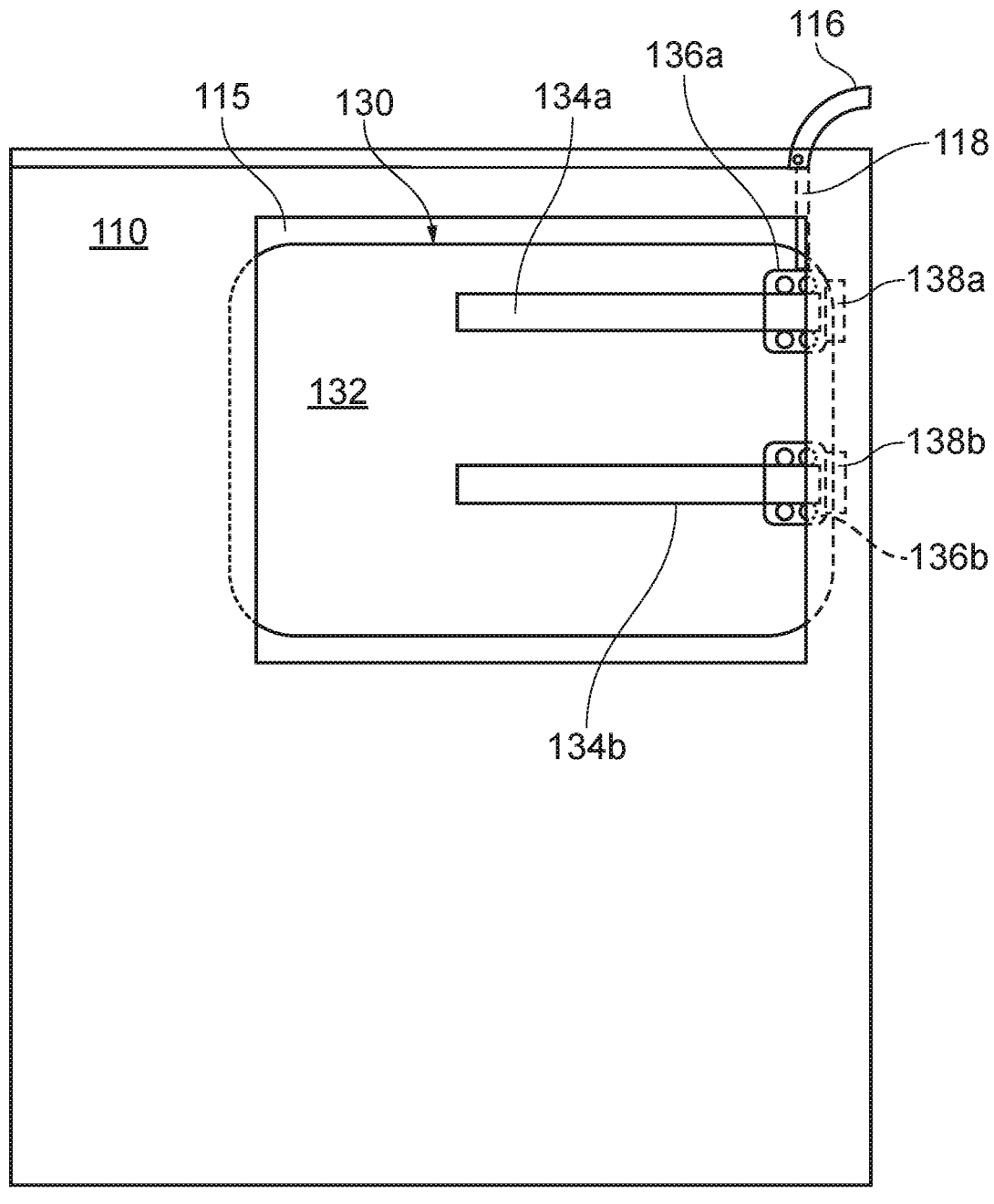

As shown in FIG. 3e, the removable fixing members 140 may be removed. This may allow relatively free movement between the door support panel 132 and the wall 110 such that the door support assembly 130 may be removed from the wall 110.

Figure 3F:
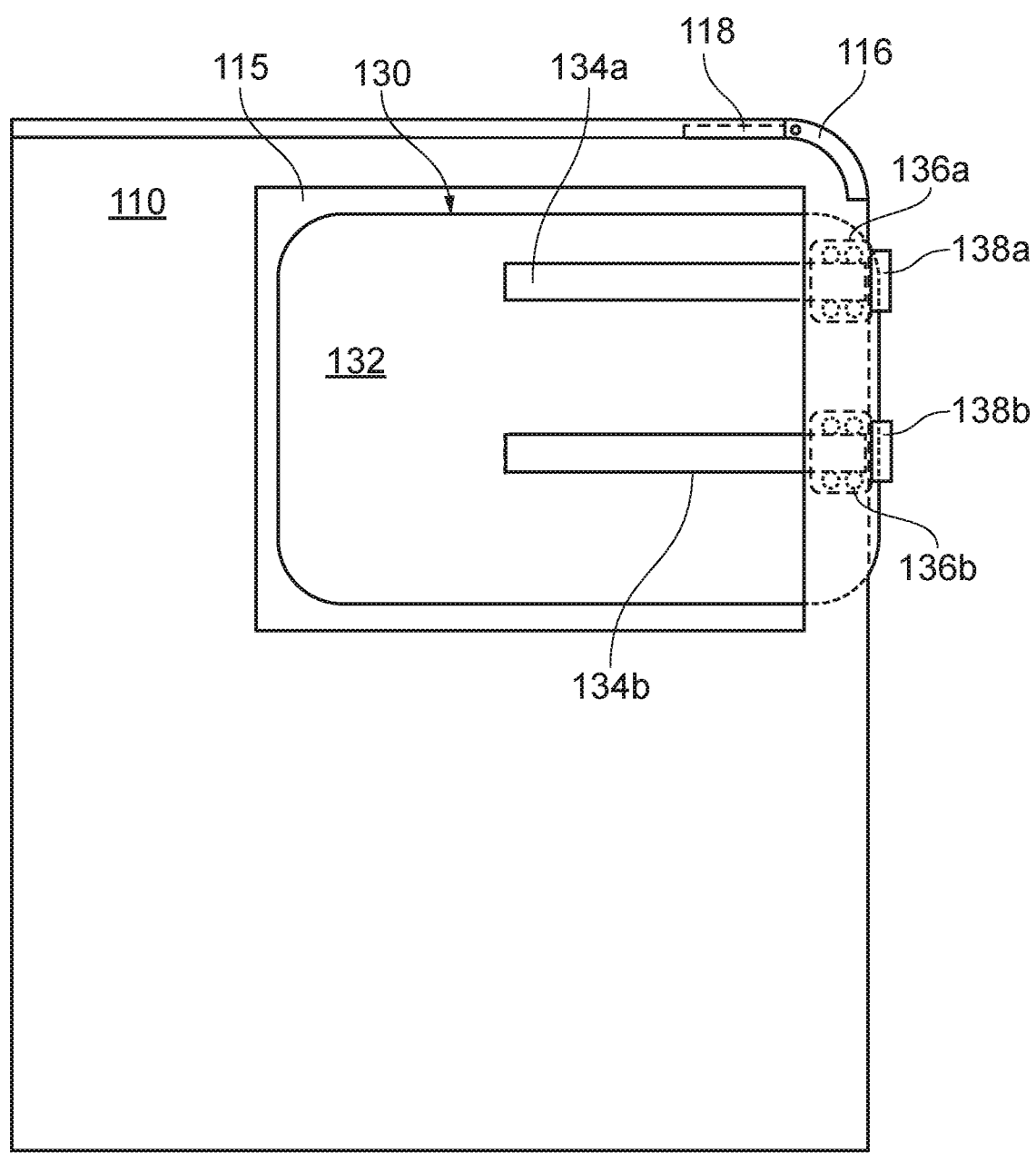

As shown in FIG. 3f, the door support assembly 130 may then be moved along the wall 110, such that a portion of the door support assembly 130 is moved out from the wall 110 through an opening in the end of the wall 110 through which the door was previously situated, such that a portion of the door support apparatus extends outwardly from the wall 110 through the opening. The door support assembly 130 may then be rotated about a rotation axis, which in this case may be a vertical axis, such that it may be removed via the access port 115. The rotatable capping 116 may be rotated to the original position in order to allow removal of the door support assembly 130.

FIGS. 4a to 4d show schematically, from a plan view, how the door support assembly 130 may be translated and rotated within the wall 110 in order to be removed. It will be understood that certain elements are omitted from FIGS. 4a to 4b for clarity. In FIG. 4a, the door is not shown as the door may be removed prior to movement of the door support assembly 130, but an opening 117 in an end face of the wall 110, through which the door may translate, is shown. As a first step, as shown in FIG. 4b, the access panel 114 may be removed to provide an access port or opening 115 in a side face of the wall 110. The door support assembly 130 may then be moved partially through the opening 117 as shown in FIG. 4c. As shown in FIG. 4d, the door support assembly 130 may be rotated about a vertical axis, while in the opening 117, so that a portion of it extends out through the access port 115. The door support assembly 130 may then be removed via the access port 115.

Figure 5A:
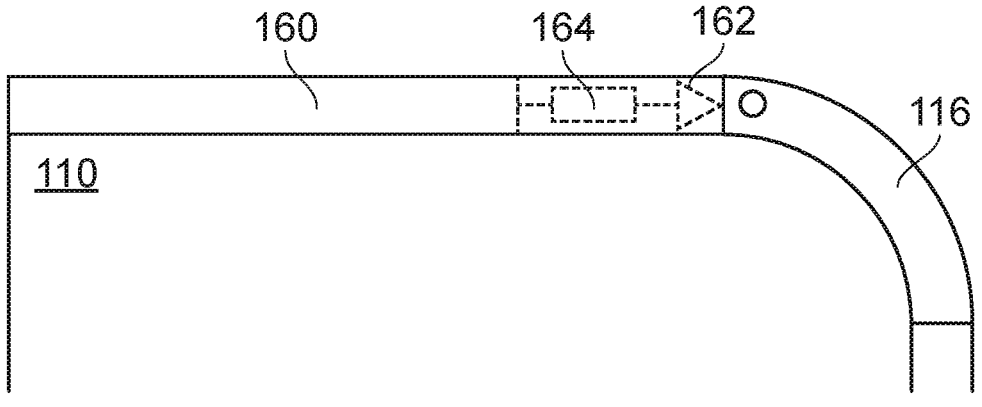
FIGS. 5a and 5b show schematic views of the rotatable cap of the passenger cubicle assembly in the first and second positions.
Figure 5B:
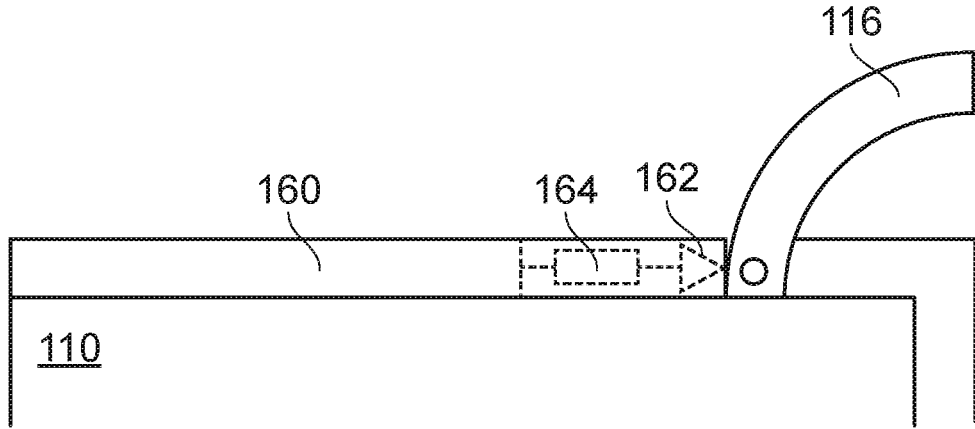

FIGS. 5a and 5b show the rotatable cap 116 in the first and second positions respectively in greater detail. Also visible is a top edge 160 of the wall 110, which may be a fixed cap or closure on the top of the wall, a detent 162, which is biased into contact with the rotatable cap 116, and a biasing member 164, such as a spring. The biasing member 164 is arranged to bias the detent 162 toward the rotatable cap 116 in order to maintain the rotatable cap in place when it is in the first position, and when the rotatable cap is rotated into the second position. The detent 162 may be biased into the rotatable cap 116 in order to maintain the rotatable cap in the second position. In this way, the rotatable cap may have a bi-stable arrangement and accidental movement of the rotatable cap 116 from the first position to the second position or vice-versa may be inhibited.

While the above embodiments have been described to illustrate the invention, it will be understood that these embodiments are described by way of example only and that various modifications of the embodiments are possible in accordance with the scope of the invention, as defined by the appended claims. For example, the wall and door may be used on vehicles other than an aircraft, such as on a train or boat and the door may be arranged to slide in a vertical direction, as opposed to a horizontal direction. The carriage and rail assemblies may also be reversed, such that the rails are fixed to the door and the carriage is fixed to a door support panel. Further, minor modifications may be made as will be known to a person skilled in the art.

The invention claimed is:

1. A passenger cubical assembly comprising:
a door;
a door support assembly having a sliding mechanism, the sliding mechanism supporting the door, the door being translatable relative to the door support assembly along a first axis;
a wall containing the door support assembly, the wall having a cavity within, the cavity sized to permit translation of the door into the cavity, the wall having an access port adjacent to the door support assembly;
wherein the door support assembly is moveable into the cavity and, while in the cavity, the door support assembly is rotatable about a rotation axis perpendicular to the first axis, and, following the rotation, removable via the access port.

2. The passenger cubical assembly of claim 1, wherein the sliding mechanism comprises a rail fixed to the door support assembly and a carriage arranged to slide along the rail, the carriage being coupled the door.

3. The passenger cubical assembly of claim 2, wherein the door is coupled to the carriage assembly via one or more pins, such that the door is removable from the carriage assembly by translation parallel to the rotation axis.

4. The passenger cubical assembly of claim 2, further comprising a rotatable cap arranged to rotate between a first position, where the rotatable cap prevents decoupling of the door from the carriage, and a second position where the rotatable cap allows decoupling of the door from the carriage.

5. The passenger cubical assembly of claim 4, wherein the rotatable cap is arranged to engage the carriage in the second position to prevent movement of the carriage along the rail and the rotatable cap is arranged to allow movement of the carriage when in the first position.

6. The passenger cubical assembly of claim 4, further comprising a detent arranged to maintain the rotatable cap in the first and/or second position.

7. The passenger cubical assembly of claim 1, further comprising a plurality of removable fixing members arranged to fix the door support assembly to the wall, to prevent movement of the door support assembly relative to the wall.

8. The passenger cubical assembly of claim 7, wherein the removable fixing members are adjustable to adjust a position and orientation of the door support assembly relative to the wall.

9. The passenger cubical assembly of claim 1, wherein the door further comprises a wheel arranged to roll on an adjacent rail parallel to the first axis.

10. The passenger cubical assembly of claim 1, further comprising a wheel arranged to rotate about a stationary axis, the wheel being arranged to engage an edge of the door.

11. An aircraft including the passenger cubical assembly of claim 1.

12. The passenger cubical assembly of claim 9, wherein the wheel is grooved to prevent rotation of the door about an axis perpendicular to the first axis.

13. The passenger cubical assembly of claim 10, wherein the wheel is arranged to engage a rail coupled to an edge of the door.

14. A method of removing a door support assembly from a wall, the door support assembly having a sliding mechanism, the sliding mechanism arranged to support a door such that the door may translate relative to the wall along a first axis into a cavity within the wall; the method comprising:

moving the door support assembly in a first direction into the cavity in the wall; rotating the door support assembly about a rotation axis perpendicular to the first direction; and removing the door support assembly from the wall via an access port formed in the wall by moving the door support assembly in a second direction, the second direction being perpendicular to the rotation axis.

15. The method of claim 14, further comprising removing a fixing member from the door support assembly, the fixing member arranged to fix the door support assembly to the wall.

16. The method of claim 14, further comprising decoupling the door from the door support assembly before moving the door support assembly.

17. The method of claim 16, wherein the wall further comprises a rotatable cap, and the method further comprises rotating the rotatable cap from a first position in which the rotatable cap extends at least partially over the door to prevent decoupling of the door from the door support assembly to a second position in which the rotatable cap extends over the door to a lesser extent, such that the door can be decoupled from the door support assembly.

*   *   *   *   *